(12) United States Patent
Miller et al.

(10) Patent No.: US 12,445,114 B1
(45) Date of Patent: Oct. 14, 2025

(54) INTELLIGENT POWER NOISE REDUCTION

(71) Applicant: Amazon Technologies, Inc., Seattle, WA (US)

(72) Inventors: Jason Miller, Stamford, CT (US); Sivaseetharaman Pandi, Round Rock, TX (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/462,167

(22) Filed: Sep. 6, 2023

(51) Int. Cl.
*G06F 1/28* (2006.01)
*G06N 3/08* (2023.01)
*H03H 11/04* (2006.01)

(52) U.S. Cl.
CPC ............ *H03H 11/04* (2013.01); *G06F 1/28* (2013.01); *G06N 3/08* (2013.01); *H03H 2011/0488* (2013.01)

(58) Field of Classification Search
CPC .. H03H 11/04; H03H 2011/0488; G06F 1/28; G06N 3/08
See application file for complete search history.

(56) References Cited

U.S. PATENT DOCUMENTS

| | | | | |
|---|---|---|---|---|
| 8,060,762 | B2 * | 11/2011 | Banginwar | G06F 1/3296 713/300 |
| 8,595,515 | B1 * | 11/2013 | Weber | G06F 1/26 713/320 |
| 10,348,281 | B1 * | 7/2019 | Oliver | H03K 19/00369 |
| 10,707,877 | B1 * | 7/2020 | Majumder | H03L 7/099 |
| 11,886,275 | B2 * | 1/2024 | Lyakhov | G06F 1/28 |
| 11,960,339 | B2 * | 4/2024 | Chapman | G06F 1/28 |
| 2011/0252260 | A1 * | 10/2011 | Flachs | G06F 1/329 713/324 |
| 2013/0311792 | A1 * | 11/2013 | Ponnathota | G06F 1/26 713/300 |
| 2014/0006818 | A1 * | 1/2014 | Doshi | G06F 1/206 713/320 |
| 2015/0046685 | A1 * | 2/2015 | Park | G06F 1/206 712/220 |
| 2015/0177798 | A1 * | 6/2015 | Venishetti | G06F 1/263 713/300 |
| 2016/0118137 | A1 * | 4/2016 | Zhang | G11C 29/021 365/185.09 |
| 2016/0350156 | A1 * | 12/2016 | Lo | G06F 9/5094 |
| 2017/0357279 | A1 * | 12/2017 | Hovis | G05F 1/625 |
| 2018/0233604 | A1 * | 8/2018 | Gu | H03H 11/04 |
| 2018/0314308 | A1 * | 11/2018 | Savidis | G06F 9/4893 |
| 2019/0220082 | A1 * | 7/2019 | Sato | G06F 1/28 |
| 2020/0142735 | A1 * | 5/2020 | Maciocco | H04L 41/142 |
| 2020/0409450 | A1 * | 12/2020 | Hovis | G06F 1/3296 |

(Continued)

*Primary Examiner* — Aurel Prifti
(74) *Attorney, Agent, or Firm* — Weaver Austin Villeneuve & Sampson LLP

(57) ABSTRACT

Techniques for improving power integrity when executing a workload on an integrated circuit device may include applying a preset configuration to a power distribution network of the integrated circuit device for the workload being executed. A power distribution network controller can monitor a voltage noise level and/or a bit error rate of the integrated circuit device. Active filtering components of the power distribution network can be dynamically adjusted to keep the integrated circuit device within a voltage noise target and/or a bit error rate target.

19 Claims, 6 Drawing Sheets

(56) References Cited

U.S. PATENT DOCUMENTS

| | | | |
|---|---|---|---|
| 2021/0050932 A1* | 2/2021 | Xuan | H04L 1/0009 |
| 2021/0326058 A1* | 10/2021 | Lee | G06F 3/0629 |
| 2023/0071427 A1* | 3/2023 | Fluhr | G06F 1/3206 |
| 2023/0144770 A1* | 5/2023 | Chapman | G06F 1/324 |
| | | | 713/340 |
| 2023/0251699 A1* | 8/2023 | Acharya | G06F 13/4282 |
| | | | 713/340 |
| 2024/0007955 A1* | 1/2024 | Turullols | G06F 1/324 |
| 2024/0045699 A1* | 2/2024 | Tang | G06N 20/00 |
| 2024/0322675 A1* | 9/2024 | Zlotnik | H02M 3/04 |

* cited by examiner

INTELLIGENT POWER NOISE REDUCTION

BACKGROUND

Integrated circuit (IC) devices can have multiple components that perform various functions. Some example components may include processors, memory controllers, network interface controllers, input/output (I/O) controllers, accelerators, etc. The power demands of the various components can vary depending on the workload being executed.

BRIEF DESCRIPTION OF THE DRAWINGS

Various embodiments in accordance with the present disclosure will be described with reference to the drawings, in which.

DETAILED DESCRIPTION

Poor power integrity can result in system performance degradation, data corruption, and/or signal integrity issues. One approach to provide power integrity is to have a low and broad system impedance for the chip power, which is achieved, in part, by implementing a large number of passive components such as decoupling capacitors. However, this approach may require a large board area to implement, and the accuracy of this approach can be limited by the tolerances of these components. Furthermore, different workloads may have different power and current demands. The use of passive components may not provide the ability to dynamically adjust the impedance to account for different workloads.

The techniques disclosed herein provide an intelligent power noise reduction system to improve the power integrity of integrated circuits (ICs). Optimization techniques such as machine learning can be used with adaptive filtering and active workload management to dynamically analyze and reduce power noise disturbances in real-time. By intelligently identifying and canceling out power noise components and managing workloads, the signal quality can be improved to ensure reliable and high-performance operation of power-hungry ICs in demanding applications.

A power distribution network (PDN) that provides power to an integrated circuit device may include active filtering components that can be adjusted to vary impedances on the integrated circuit device to reduce noise on the power signals. During an initial or training phase, various workloads can be executed on an integrated circuit device operating at a target frequency. The configuration of the active filtering components can be adjusted to meet a voltage noise target and/or a bit error rate target to derive a preset configuration of the PDN for the workload. After the initial or training phase, when the integrated circuit device is put into service to execute a workload, a preset configuration of the PDN for the workload can be applied to the integrated circuit device. Voltage noise level and/or bit error rate of the integrated circuit device can be monitored during execution of the workload, and the active filtering components of the PDN can be adjusted to keep the integrated circuit device within the voltage noise target and/or bit error rate target.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
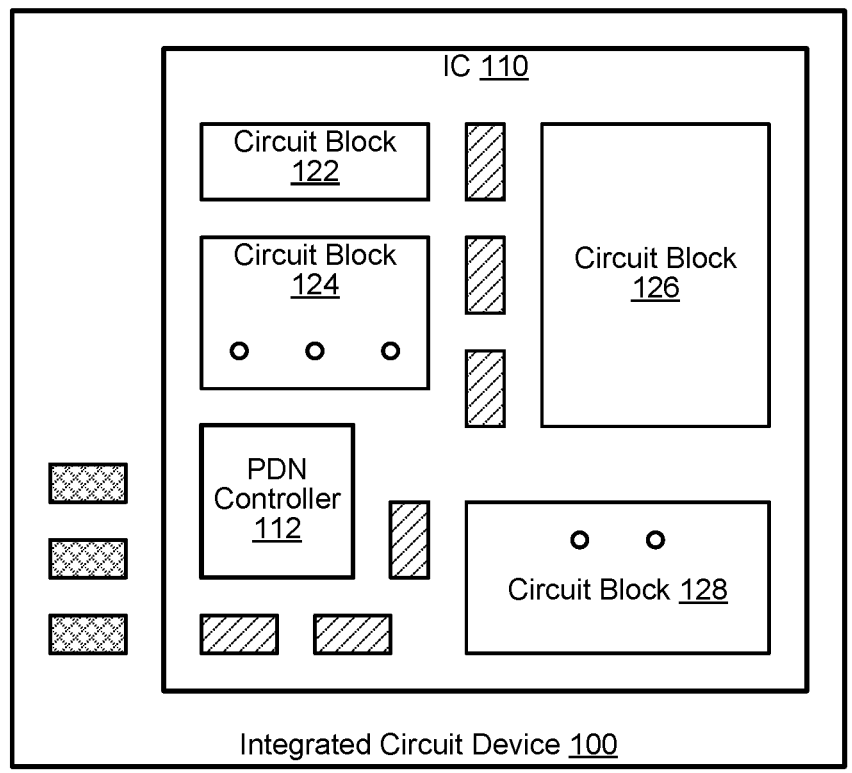
FIG. 1 illustrates a simplified block diagram of an example of an integrated circuit device, according to certain aspects of the disclosure.

FIG. 1 illustrates a simplified block diagram of an example of an integrated circuit device 100. Integrated circuit device 100 may include an integrated circuit 110 such as a single or multicore chip, a system-on-a-chip (SoC), an application specific integrated circuit (ASIC), or other types of integrated circuits. In some implementations, integrated circuit device 100 can be part of a computing device that can execute a variety of applications. For example, integrated circuit device 100 can be implemented in a server at a data center to support cloud computing workloads.

Integrated circuit 110 may include various functional circuit blocks such as circuit blocks 122, 124, 126, and 128. Integrated circuit 110 may have additional circuit blocks not specifically shown, or have fewer circuit blocks than what is shown. Different circuit blocks may perform different functions. Some of the circuit blocks may also perform the same or similar function (e.g., different instances of the same circuit block). By way of example, the circuit blocks in integrated circuit 110 may include any of a processor, an on-chip memory, a memory controller, a direct memory access (DMA) engine, an accelerator (e.g., graphic processing unit, a digital signal processor, a tenor processing unit, etc.), a network interface controller, an input/output (I/O) or bus controller, etc.

Integrated circuit device 100 may include a power distribution network (PDN) to deliver power to integrated circuit 110. The PDN may include a power grid (not shown) to distribute power supply voltages (e.g., core voltage, ground, etc.) to various parts of integrated circuit 110. The PDN may also include active filtering components that can be controlled to adjust impedances and/or voltages on integrated circuit 110. The active filtering components may include on-chip active filtering components 132 that are disposed on integrated circuit 110, and/or off-chip active filtering components 134 that are disposed on a printed circuit board or a package of integrated circuit 110.

Examples of off-chip active filtering components 134 may include active voltage regulators, varactors, etc. Examples of on-chip active filtering components 132 may include active low-pass filters, active notch filters, adaptive noise cancellation circuits, etc. In some implementations, some of the on-chip components can be replaced with their off-chip counterparts, and/or vice versa. Integrated circuit device 100 may also include both off-chip and on-chip components of the same type. For example, integrated circuit device 100 may include off-chip active voltage regulators (e.g., for coarse adjustments), as well as on-chip active voltage regulators (e.g., for fine adjustment). In some implementations, the PDN of integrated circuit 110 may also include passive components such as decoupling capacitors.

Active voltage regulators can be dynamically adjusted to maintain a stable and clean output voltage. When the current demand fluctuates, an active voltage regulator can regulate its output to deliver a constant voltage while providing the load current. In some implementations, the target voltage of the active voltage regulator can be adjusted to adapt the PDN to suppress voltage noise and/or bit error rate of integrated circuit 110.

Varactors can be implemented as diodes that operate in a reverse-biased state such that no DC current flows through the device. The amount of reverse bias controls the thickness of the depletion zone, and therefore the varactor's junction capacitance. The change in capacitance can depend on the doping profile. Generally, for abrupt junction profile, the depletion region thickness is proportional to the square root of the applied voltage, and capacitance is inversely proportional to the depletion region thickness. Thus, the capacitance is inversely proportional to the square root of the applied voltage, and can be tuned by adjusting the applied voltage.

Active low-pass filters and/or active notch filters can selectively attenuate specific frequencies of noise. For isolation, this may involve increasing the impedance to prevent noise propagation between circuit blocks. Active low-pass filters and/or active notch filters can be adjusted by changing the setpoints of the cutoff frequency, and/or by enabling/disabling specific filters that are designed for attenuating specific frequencies.

Adaptive noise cancellation circuits may include a sensor to capture the voltage noise, and a feedback loop that generates an anti-noise signal to cancel out the noise. For example, a voltage noise oscillating at a certain frequency can be canceled by coupling the noise signal with an out-of-phase version of the noise signal. Adaptive noise cancellation circuits can be controlled by enabling/disabling the circuit and/or the sensor capturing the voltage noise.

In some implementations, a PDN controller 112 can be used to control the active filtering components (e.g., active voltage regulator, varactors, active lo-pass filters, notch filters, adaptive noise cancellation circuits, etc.). PDN controller 112 can be integrated as part of integrated circuit 110. In some implementations, PDN controller 112 can be an off-chip component. PDN controller 112 may receive power integrity information from integrated circuit 110. The power integrity information may include voltage noise measurements taken from various voltage noise sensing circuits 136 and/or bit error rates detected by one or more of the circuit blocks or at the interfaces between the circuit blocks. The voltage noise sensing circuits 136 can be strategically placed at locations of integrated circuit 110 having high current consumption or high power demands. These locations can be identified, for example, from a heat map obtained by simulation of integrated circuit 110. For example, circuit block 124 can be a processor with floating-point computational units that draw large currents, and some of the voltage noise sensing circuits 136 can be placed at or near the locations of these units. As another example, circuit block 128 can be an on-chip memory having high power consumption for memory intensive workloads, and some of the voltage noise sensing circuits 136 can be placed at or near the memory.

Figure 2:
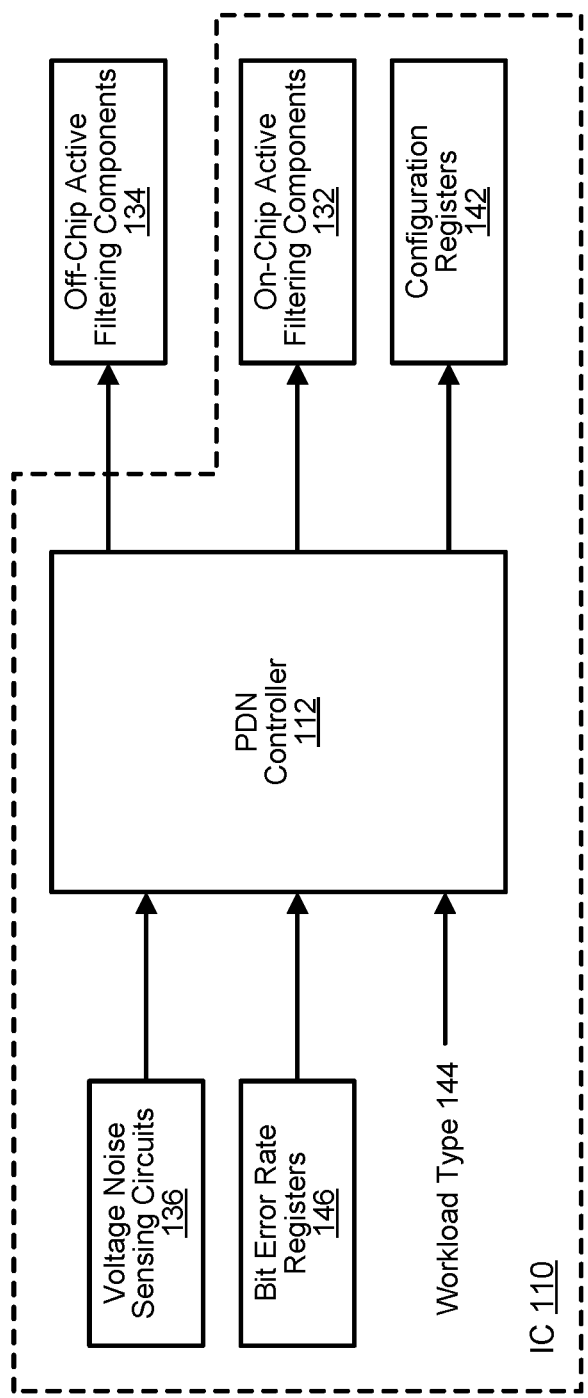
FIG. 2 illustrates a conceptual diagram of the operation of an example of a power distribution network (PDN) controller, according to certain aspects of the disclosure.

FIG. 2 illustrates a conceptual diagram of the operation of the PDN controller 112. As mentioned above, PDN controller 112 may receive voltage noise measurements from voltage noise sensing circuits 136 placed at various locations on integrated circuit 110. A voltage noise sensing circuit 136 may detect voltage fluctuations that deviate from a nominal supply voltage. The amount of deviation can be encoded in digital signal, and a vector of digital noise values representing the voltage noise levels at various locations on integrated circuit 110 can be provided to PDN controller 112.

PDN controller 112 may also receive bit error rates from various bit error rate registers 146 of integrated circuit 110. The bit error rate registers 146 can be native to certain circuit blocks. For example, certain circuit blocks such as network interface controllers, bus controllers, memory controllers, interconnect fabrics, etc. may perform error detection and/or correction on data being processed by the circuit block. Such circuit blocks may maintain error counters (e.g., correctable errors, uncorrectable errors, etc.) as part of the circuit block's native function, and information from the error counters can be provided to PDN controller 112. In some implementations, error detection circuitry can also be inserted, for example, at interfaces between circuit blocks if certain circuit blocks of interest do not have native error counters.

By receiving a vector of digital noise values at various locations on integrated circuit 110 and a set of bit error rates from various circuit blocks and/or interfaces between circuit blocks, PDN controller 112 can obtain a real-time information on the power integrity of integrated circuit 110. If a certain location or circuit block of integrated circuit 110 is experiencing excessive power supply voltage noise or excessing bit errors, PDN controller 112 can adjust the active filtering components of the PDN or adjust the workload being executed to suppress the noise or errors.

PDN controller 112 may also received a workload type 144 of workload identifier to indicate the type of workload being executed on the integrated circuit 110. Workload type 144 can be use, for example, to set the on-chip active filtering components 132 and/or off-chip active filtering components to a preset configuration suitable for the particular type of workload being executed.

PDN controller may generate a set of off-chip control signals to control or adjust the off-chip active filtering components 134. This may include, for example, adjusting the voltage targets of active voltage regulators, adjusting the control voltage of varactors to change the amount of decoupling capacitance, etc. PDN controller may generate a set of on-chip control signals to control or adjust the on-chip active filtering components 132. This may include, for example, adjusting the set points for the cutoff frequencies of the active low-pass or notch filters, enabling/disabling the active low-pass or notch filters, enabling/disabling the adaptive noise cancellation circuits, etc.

If adjusting the on-chip active filtering components 132 and/or the off-chip active filtering components 134 are unsuccessful to bring the voltage noise level and/or bit error rate down to an acceptable level, PDN controller 112 can adjust the workload being executed by integrated circuit 110 by changing certain settings of integrated circuit 110 by writing configuration registers 142. For example, PDN controller 112 may perform dynamic frequency scaling, dynamic voltage scaling, dynamic block activation, etc. to perform workload management for integrated circuit 110. In some scenarios, to reduce voltage noise and/or improve the bit error rate, the operating frequency and/or operating voltage of certain circuit blocks can be lowered to reduce the current demand. Parallel processing blocks can also be turned off to retard performance and lower the current demand. In some scenarios, PDN controller 112 may also increase the operating frequency, operating voltage, and/or enable parallel processing blocks, for example, when integrated circuit 110 is operating below the target voltage noise level and/or bit error rate. This can be done to increase the performance of integrated circuit 110 until the voltage noise level and/or bit error rate approach their acceptable threshold levels.

Figure 3:
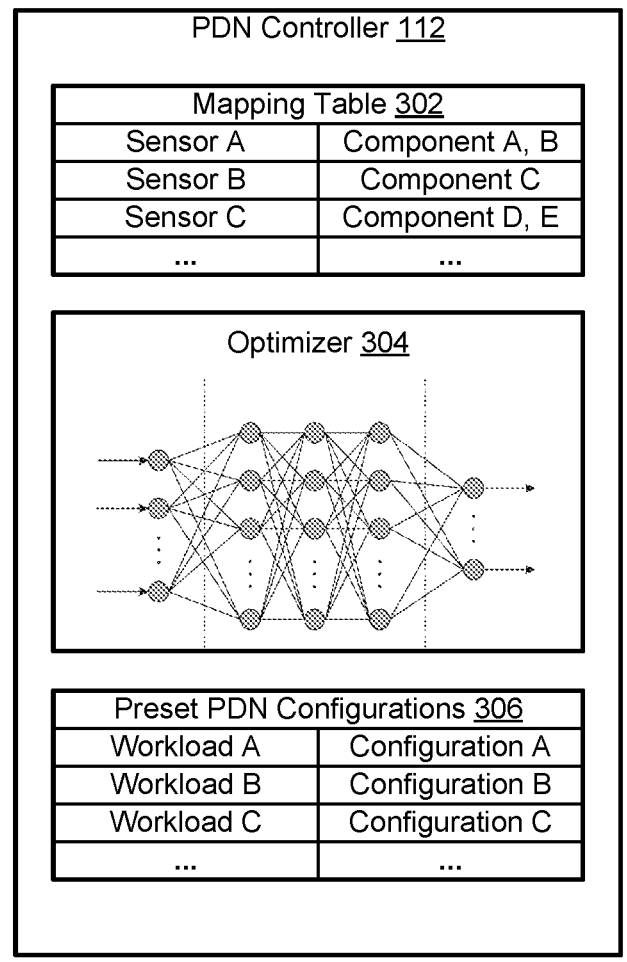
FIG. 3 illustrates a simplified block diagram of an example of a PDN controller, according to certain aspects of the disclosure.

FIG. 3 illustrates a simplified block diagram of an example of a PDN controller 112. PDN controller 112 can be implemented, for example, using a processor executing program code, a FPGA configured to perform the PDN controller functions, or an ASIC with circuitry designed to perform the PDN controller functions. PDN controller 112 may include a mapping table 302 that maps locations of voltage noise sensing circuits and/or bit error rates to nearby active filtering components. In this manner, when excessive noise or bit errors are detected, PDN controller 112 can adjust the relevant components that can have an impact on the location of the noise and/or bit errors. In some implementations, the mapping can be correlated with the different circuit blocks of integrated circuit 110.

PDN controller 112 includes an optimizer 304 that performs adjustment of the active filtering components and workload management. In some implementations, optimizer 304 can be implemented with a machine learning or neural network model. The neural network model may have various inputs such as the measured voltage noise levels, bit error rates, operating conditions of the workload (e.g., operating frequency, operating voltage, number of active blocks, etc.), current configuration of the active filtering components of the PDN, etc. The neural network model can generate an output that includes configuration for the active filtering components and operating conditions of the workload to minimize the voltage noise level and/or bit error rate.

The neural network model can be trained with various different types of workloads to learn the power demand characteristics of the workloads. For each of the workloads, the integrated circuit can initially be operated at a target frequency. The active filtering components of the PDN can be adjusted and tuned to meet a voltage noise target and/or bit error rate target (e.g., either of which can be zero or with a small acceptable tolerance). If after a certain threshold number of adjustment attempts have failed to bring the voltage noise and/or bit error rate to their target levels, the operating frequency of the integrated circuit can be lowered and the adjustment attempts can be repeated. If executing the workload at the initial target frequency is able to meet the voltage noise target and/or bit error rate target without any adjustments, the target frequency can be increased to find the maximum target frequency that the workload can be executed at without causing errors.

The neural network model may generate a preset configuration of the PDN that is suitable for each of the workloads. Hence, after the training phase, PDN controller 112 may store a set of preset PDN configurations 306 that include a preset configuration for each type of workload. In some implementations, instead of having a different preset configuration for each type of workload, the preset configuration derived for the worst-case workload (e.g., workload with the highest current consumption or power demand) can be used as the overall preset configuration for the PDN.

In some implementations, the neural network model can also learn and classify the different workloads. For example, different workloads may manifest different voltage noise and/or bit error rates at different operating frequencies and at different locations on the integrated circuit 110. The correlation between the locations, amount of voltage noise and/or bit error rates, and the operating frequencies can be indicative of the workload type. When a new workload is being executed on the integrated circuit device, instead of having to retrain the model for the new workload, the neural network model can monitor the voltage noise and/or bit errors, and configure the PDN with the preset configuration of the workload that is most similar to the new workload based on the observed voltage noise and/or bit errors.

Aside from a neural network model, optimizer 304 can also be implemented with other optimization algorithms such as polynomial fitting to evaluate the objective function to minimize voltage noise and/or bit errors for a given workload executing on the integrated circuit. More generally, the optimization algorithm can be initialized by selecting an initial set of solutions. This may include the maximum expected target frequency, initial capacitance values, voltage regulator settings, voltage noise tolerances, etc. The objective function can be evaluated for the current solution. At each iteration, it is determined if the termination criteria (e.g., voltage noise target, error bit rate target) are met. If the termination criteria are met, the algorithm can return the best solution found so far (e.g., the PDN configuration). The solution can be updated iteratively when a better solution is found, for example, by adjusting capacitance values, voltage regulator settings, etc.

Figure 4:
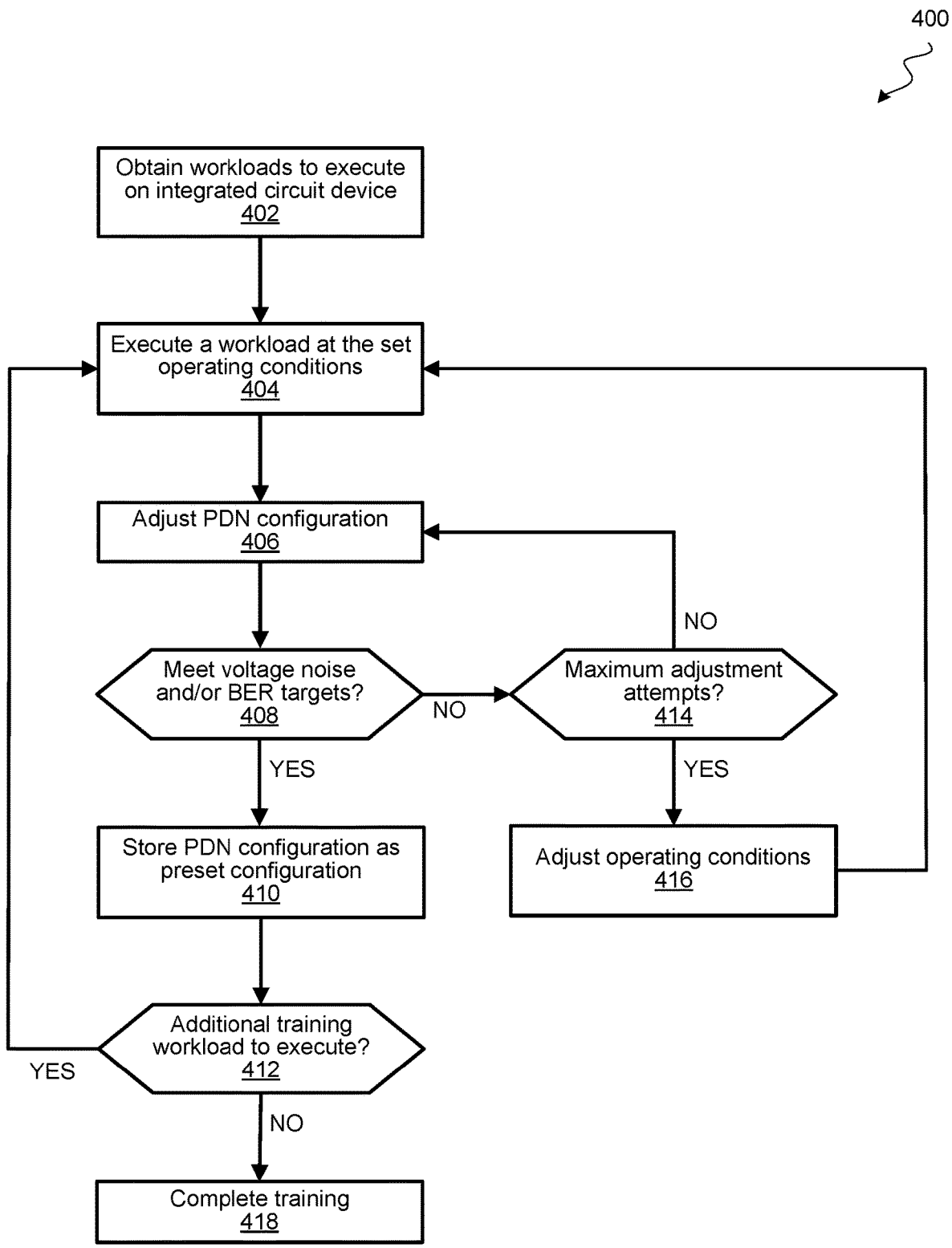
FIG. 4 illustrates a flow diagram of an example of a process for training a PDN controller, according to certain aspects of the disclosure.

FIG. 4 illustrates a flow diagram of an example of a process 400 for performing an initial or training phase of a power noise reduction system of an integrated circuit device (e.g., integrated circuit device 100). During the initial or training phase, various training workloads can be executed on the integrated circuit. The power distribution network (PDN) configuration for the integrated circuit can be optimized to meet a voltage noise target and/or a bit error rate target to derive a preset configuration for each of the training workloads. Process 400 can be performed, for example, by a power distribution network controller (e.g., PDN controller 112) executing a neural network model or other suitable optimization algorithms. Certain aspects of process 400 can be implemented as instructions or code stored in a non-transitory computer-readable medium, which can be executed by a processor to perform the functions of the PDN controller.

Process 400 may begin at block 402 by obtaining various training workloads to execute on the integrated circuit device. The training workloads may invoke certain applications on the integrated circuit device, and may exercise some or all of the functional blocks of the integrated circuit device. In some implementations, workloads used for performance benchmarking can be used for at least some of the training workloads. At block 404, a workload is selected from the training workloads, and the workload is executed on the integrated circuit device at the set operating conditions. The initial operating conditions can be set at the target or expected operating conditions of the integrated circuit device for the particular workload. The operating conditions may include, for example, the operating frequency, operating voltage, current limit, and/or the number of active blocks (e.g., processor cores). A workload identifier can be associated with the workload being executed.

At block 406, the PDN configuration including settings for the active filtering components of the PDN are adjusted and tuned. In some implementations, the settings for the active filtering components can be adjusted towards certain target impendences. At block 408, the voltage noise levels of the integrated circuit device are measured at the various sensing points by the voltage noise sensing circuits, and/or bit error rates of the functional circuit blocks and/or interfaces are obtained (e.g., by reading error counters). A determination is made as to whether the voltage noise levels and/or bit error rates meet their respective targets.

If the voltage noise target and/or bit error rate target are not met, then at block 414, a determination is made as to whether a maximum number of adjustment attempts have been made for the workload operating at the current frequency. In some implementations, the number of allowable adjustment attempts can be configurable. If the maximum number of adjustment attempts has not yet been reached, process 400 returns to block 406 to make further adjustments to the PDN configuration. If the maximum number of adjustment attempts has been reached, process 400 proceeds to block 416 to adjust the operating conditions of the integrated circuit device. This may include reducing the operating frequency, operating voltage, current limit, and/or number of active blocks. For example, the operating frequency can be lowered to reduce the current or power demands. Process 400 then returns to block 404 to execute the workload at the adjusted operating conditions. This process repeats until a PDN configuration for the current workload is found that meets the voltage noise target and/or bit error rate target. In some implementations, the target frequency of the integrated circuit device can be adjusted iteratively to find a maximum allowable target frequency for the workload Referring back to block 408, if the PDN configuration satisfies the voltage noise target and/or bit error rate target, the PDN configuration is stored as a preset configuration for the workload, for example, by associating the PDN configuration with the workload identifier. At block 412, a determination is made if there is any additional training workload to execute. If so, process 400 returns to block 404 to execute the next workload. If all training workload has been processed, the initial or training phase can be considered complete at block 418. It should be noted that even though the training can be considered complete, additional training can be performed, for example, when new workloads become available.

Figure 5:
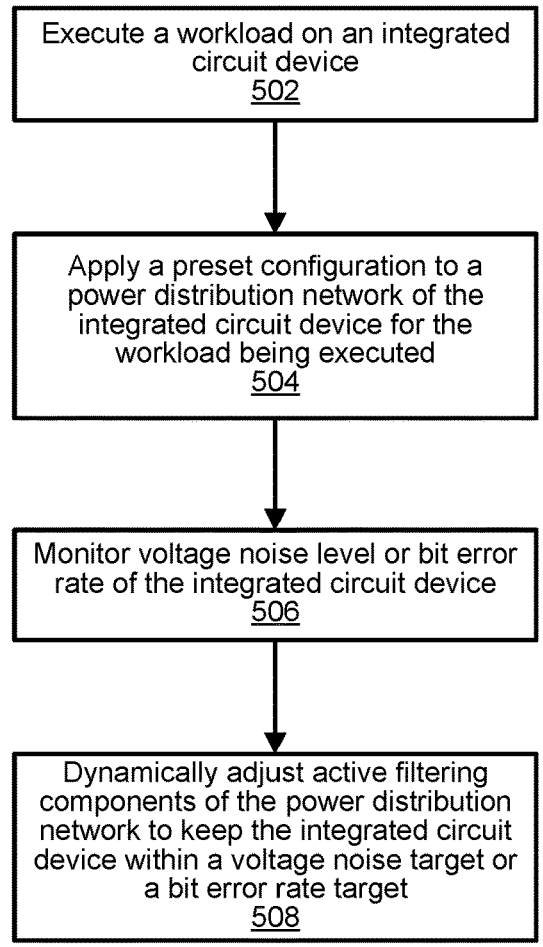
FIG. 5 illustrates a flow diagram of an example of a process for executing a workload, according to certain aspects of the disclosure.

FIG. 5 illustrates a flow diagram of an example of a process 500 for executing a workload on an integrated circuit device (e.g., integrated circuit device 100). Process 500 can be performed, for example, by a power distribution network controller (e.g., PDN controller 112) subsequent to the initial or training phase of process 400. Certain aspects of process 500 can be implemented as instructions or code stored in a non-transitory computer-readable medium, which can be executed by a processor to perform the functions of the PDN controller.

Process 500 may begin at block 502 by executing a workload on the integrated circuit device. At block 504, a preset configuration is applied to the PDN of the integrated circuit device for the workload being executed. For example, process 400 may have provided the PDN controller with preset PDN configurations corresponding to different workloads. The workload identifier of the workload being executed can be used to look up and retrieve the preset configuration for the workload from the memory of the PDN controller. In addition to setting the active filtering components of the PDN, the preset configuration may also set the operating frequency of the integrated circuit device. In some implementations, instead of applying a preset configuration specific to the workload, a preset configuration corresponding to the worst-case workload (e.g., highest power consumption workload) can be used for different types of workloads.

At block 506, the voltage noise level and/or the bit error rate of the integrated circuit device are monitored. The voltage noise level can be monitored at various sensing locations on the integrated circuit device. The bit error rate can be obtained for various circuit blocks or interfaces between circuit blocks. If the voltage noise level and/or the bit error rate exceed their respective tolerable targets during execution of the workload, then the active filtering components of the PDN can be dynamically adjusted at block 508 to keep the integrated circuit device within the voltage noise target and/or a bit error rate target. If the voltage noise level and/or the bit error rate continues to exceed their respective tolerable targets after adjusting the active filtering components, the PDN controller may adjust the operating conditions of the workload. The operating conditions of the workload can be adjusted, for example, by adjusting an operating frequency, adjusting an operating voltage, adjusting a current limit on the current being supplied to the integrated circuit device, or adjusting a number of active blocks in the integrated circuit device.

Figure 6:
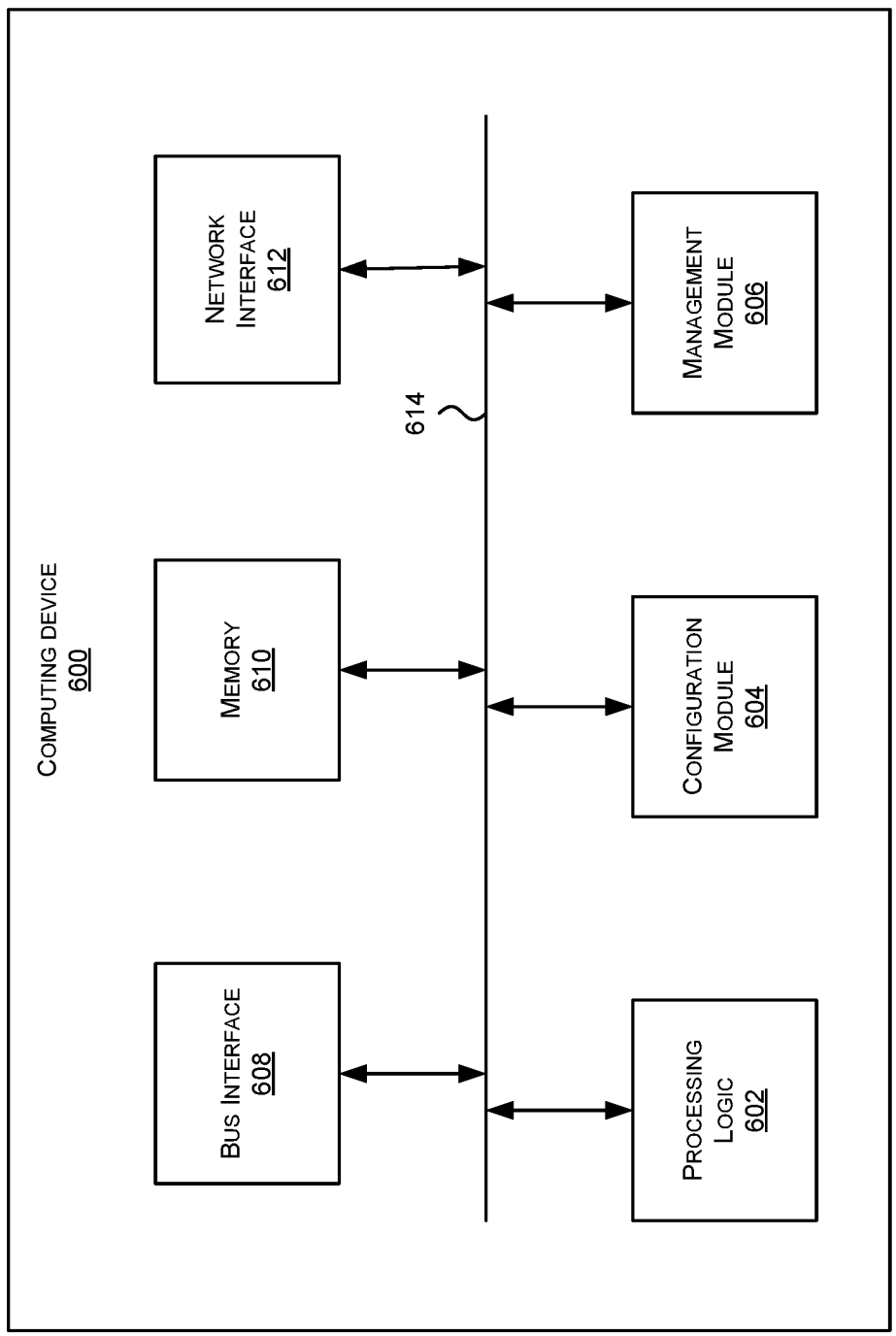
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. For example, the computing device 600 can include integrated circuit devices that utilizes the power noise reduction techniques described herein.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARMR, MIPSR, AMDR, Intel R, QualcommR, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested herein, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for performing power noise reduction for an integrated circuit device, the method comprising:
   executing a plurality of workloads on the integrated circuit device;
   for each of the plurality of workloads, optimizing configuration of a power distribution network having active filtering components to meet a voltage noise target and a bit error rate target to derive a filtering configuration;
   selecting the filtering configuration for a highest power consumption workload of the plurality of workloads to use as a preset configuration of the power distribution network for the plurality of workloads; and
   subsequent to deriving the preset configuration of the power distribution network:
      executing a workload that belongs to the plurality of workloads on the integrated circuit device;
      applying the preset configuration of the power distribution network for the workload being executed;
      monitoring a voltage noise level and a bit error rate of the integrated circuit device; and
      dynamically adjusting the power distribution network and operating conditions for the workload to keep the integrated circuit device within the voltage noise target and the bit error rate target.

2. The method of claim 1, wherein optimizing the configuration of the power distribution network includes training a neural network model to generate the preset configuration for the workload.

3. The method of claim 1, wherein adjusting the power distribution network includes adjusting the active filtering components including one or more of a varactor, an active voltage regulator, an active low-pass filter, an active notch filter, or an adaptive noise cancellation circuit.

4. The method of claim 1, wherein adjusting the operating conditions of the workload includes adjusting an operating frequency of the integrated circuit device, adjusting an operating voltage of the integrated circuit device, adjusting a current limit of the integrated circuit device, or adjusting a number of active blocks in the integrated circuit device.

5. A method comprising:
   executing a workload on an integrated circuit device;
   applying a preset configuration to a power distribution network of the integrated circuit device for the workload being executed;
   monitoring a bit error rate of the integrated circuit device; and
   dynamically adjusting active filtering components of the power distribution network to keep the integrated circuit device within a bit error rate target,
   wherein the preset configuration of the power distribution network is derived by:
      executing a plurality of workloads on the integrated circuit device;
      for each of the plurality of workloads:
         operating the integrated circuit device at a target frequency; and
         optimizing a configuration of the power distribution network to meet the bit error rate target; and
      selecting the configuration for a highest power consumption workload of the plurality of workloads to use as the preset configuration for the power distribution network, the preset configuration being used for each workload in the plurality of workloads.

6. The method of claim 5, wherein different groups of plurality of workloads have different preset configurations for the power distribution network.

7. The method of claim 5, wherein optimizing the configuration of the power distribution network includes iteratively adjusting the target frequency of the integrated circuit device to find a maximum allowable target frequency for the workload.

8. The method of claim 5, wherein optimizing the configuration of the power distribution network includes training a neural network model to generate the preset configuration for the workload.

9. The method of claim 5, wherein the preset configuration of the power distribution network includes settings for the active filtering components including one or more of a varactor, an active voltage regulator, an active low-pass filter, an active notch filter, or an adaptive noise cancellation circuit.

10. The method of claim 5, further comprising adjusting operating conditions for the workload.

11. The method of claim 10, wherein adjusting the operating conditions for the workload includes adjusting an operating frequency of the integrated circuit device, adjusting an operating voltage of the integrated circuit device, adjusting a current limit of the integrated circuit device, or adjusting a number of active blocks in the integrated circuit device.

12. The method of claim 5, further comprising:
monitoring a voltage noise level of the integrated circuit device; and
dynamically adjusting the active filtering components of the PDN to keep the integrated circuit device within a voltage noise target.

13. An integrated circuit device comprising:
a power distribution network (PDN) including active filtering components;
a plurality of functional circuit blocks; and
a PDN controller operable to:
apply a preset configuration of the PDN for a workload being executed by the integrated circuit device;
monitor bit error rates of the plurality of functional circuit blocks; and
dynamically adjust the active filtering components of the PDN to keep the integrated circuit device within a bit error rate target,
wherein the preset configuration is derived by:
executing a plurality of workloads on the integrated circuit device;
for each of the plurality of workloads, optimizing a configuration of the PDN to meet the bit error rate target; and
selecting the configuration for a highest power consumption workload of the plurality of workloads to use as the preset configuration for the PDN, the preset configuration being used for the plurality of workloads.

14. The integrated circuit device of claim 13, wherein dynamic adjustment of the active filtering components includes adjusting a target voltage of a voltage regulator.

15. The integrated circuit device of claim 13, wherein dynamic adjustment of the active filtering components includes adjusting an input voltage to a varactor.

16. The integrated circuit device of claim 13, wherein the PDN controller is further operable to reduce an operating frequency or an operating voltage of the integrated circuit device when the voltage noise target or the bit error rate target is not met after adjusting the active filtering components.

17. The integrated circuit device of claim 13, wherein different groups of workloads have different preset configurations.

18. The integrated circuit device of claim 13, further comprising a plurality of voltage noise sensing circuits placed at a respective power sensitive location of the integrated circuit device.

19. The integrated circuit device of claim 18, wherein the PDN controller is operable to:
monitor voltage noise sensed by the plurality of voltage noise sensing circuits; and
dynamically adjust the active filtering components of the PDN to keep the integrated circuit device within a voltage noise target.

* * * * *